United States Patent
Takeuchi et al.

(10) Patent No.: US 9,805,866 B2
(45) Date of Patent: Oct. 31, 2017

(54) LAMINATED CERAMIC ELECTRONIC COMPONENT

(71) Applicant: Murata Manufacturing Co., Ltd., Nagaokakyo-shi, Kyoto-fu (JP)

(72) Inventors: Shunsuke Takeuchi, Nagaokakyo (JP); Masashi Nishimura, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 18 days.

(21) Appl. No.: 14/702,875

(22) Filed: May 4, 2015

(65) Prior Publication Data

US 2015/0325377 A1 Nov. 12, 2015

(30) Foreign Application Priority Data

May 9, 2014 (JP) .................................. 2014-097731
Feb. 26, 2015 (JP) .................................. 2015-036266

(51) Int. Cl.
| | |
|---|---|
| H01G 4/232 | (2006.01) |
| H01G 4/30 | (2006.01) |
| H01G 4/005 | (2006.01) |
| H01G 4/12 | (2006.01) |
| H01G 4/012 | (2006.01) |

(52) U.S. Cl.
CPC .............. *H01G 4/005* (2013.01); *H01G 4/012* (2013.01); *H01G 4/12* (2013.01); *H01G 4/232* (2013.01); *H01G 4/30* (2013.01)

(58) Field of Classification Search
CPC ............ H01G 4/232; H01G 4/228; H01G 4/30
USPC .................................. 361/306.3, 301.4, 303
See application file for complete search history.

(56) References Cited

U.S. PATENT DOCUMENTS

| 8,125,764 B2* | 2/2012 | Ishida ...................... H01G 2/24 |
| | | 361/306.1 |
| 2004/0027787 A1 | 2/2004 | Yamauchi et al. |
| 2011/0293894 A1 | 12/2011 | Sato et al. |
| 2012/0018205 A1 | 1/2012 | Sato et al. |
| 2012/0019099 A1 | 1/2012 | Sato et al. |

(Continued)

FOREIGN PATENT DOCUMENTS

| CN | 1405806 A | 3/2003 |
| CN | 1471114 A | 1/2004 |

(Continued)

OTHER PUBLICATIONS

Official Communication issued in corresponding Korean Patent Application No. 10-2015-0053153, mailed on Apr. 6, 2016.

(Continued)

*Primary Examiner* — Eric Thomas
(74) *Attorney, Agent, or Firm* — Keating & Bennett, LLP

(57) ABSTRACT

A laminated ceramic electronic component includes a ceramic body, first and second inner electrodes within the ceramic body and including opposed portions opposed to each other in the thickness direction of the ceramic body, a first terminal electrode electrically connected to the first inner electrode, and a second terminal electrode electrically connected to the second inner electrode. The widthwise distance between first widthwise edges and second widthwise edges of the first and second terminal electrodes are smaller, in plan view, than widths of the first and second inner electrodes at the opposed portions.

16 Claims, 8 Drawing Sheets

(56) References Cited

U.S. PATENT DOCUMENTS

| | | |
|---|---|---|
| 2012/0073100 A1 | 3/2012 | Tsutsumi |
| 2012/0188682 A1 | 7/2012 | Sato et al. |
| 2012/0300361 A1* | 11/2012 | Togashi .................. H01G 4/30 361/301.4 |
| 2013/0056252 A1 | 3/2013 | Fujii et al. |
| 2013/0233606 A1 | 9/2013 | Fujii et al. |
| 2013/0294009 A1 | 11/2013 | Takeuchi et al. |
| 2014/0008116 A1 | 1/2014 | Fujii et al. |
| 2014/0312743 A1 | 10/2014 | Sato et al. |
| 2014/0332260 A1 | 11/2014 | Sato et al. |
| 2014/0355175 A1* | 12/2014 | Lee ........................ H01G 4/012 361/306.3 |

FOREIGN PATENT DOCUMENTS

| | | | |
|---|---|---|---|
| JP | 09260184 A | * | 10/1997 |
| JP | 11-186092 A | | 7/1999 |
| JP | 11251204 A | * | 9/1999 |
| JP | 2003-51424 A | | 2/2003 |
| JP | 2004-179531 A | | 6/2004 |
| JP | 2007-043093 A | | 2/2007 |
| JP | 2010-283180 A | | 12/2010 |
| JP | 2011-253895 A | | 12/2011 |
| JP | 2012009766 A | * | 1/2012 |
| JP | 2012-028456 A | | 2/2012 |
| JP | 2012-028458 A | | 2/2012 |
| JP | 2012114353 A | * | 6/2012 |
| JP | 2012-164966 A | | 8/2012 |
| JP | 2013-065820 A | | 4/2013 |
| JP | 2013-232606 A | | 11/2013 |

OTHER PUBLICATIONS

Official Communication issued in the corresponding Chinese Patent Application No. 201510226962.3, mailed on Apr. 17, 2017.
Official Communication issued in Japanese Patent Application No. 2015-036266, dated Jul. 4, 2017.

* cited by examiner

LAMINATED CERAMIC ELECTRONIC COMPONENT

BACKGROUND OF THE INVENTION

1. Field of the Invention

The present invention relates to a laminated ceramic electronic component, such as a laminated ceramic capacitor.

2. Description of the Related Art

In recent years, laminated ceramic capacitors have been made increasingly larger in capacitance and smaller in size along with the performance enhancement of electronic equipment. A high-dielectric ceramic material, such as barium titanate, is used for the purpose of the large-scale capacitance increase of a laminated ceramic capacitor.

The high-dielectric ceramic material has piezoelectricity and electrostriction. Accordingly, mechanical strain is caused when a voltage is applied to the laminated ceramic capacitor made of the high-dielectric ceramic material. The laminated ceramic capacitor vibrates in some cases due to the abovementioned strain. As the result of the vibration propagating to a circuit board, the circuit board may vibrate at a frequency near 20 Hz to 20000 Hz which is an audible band of frequencies. Consequently, noise referred to as acoustic noise may occur.

In the capacitor described in Japanese Patent Laid-Open No. 2013-65820, an electrode land on a circuit board is divided, and therefore, the center of an end surface of the capacitor and the electrode land are not joined to each other. Japanese Patent Laid-Open No. 2013-65820 states that a location where the amplitude of the vibration of the capacitor ascribable to the above-described strain is highest in the center of the end surface of the capacitor. Since the location of the capacitor where the amplitude is highest is not joined to the electrode land, the vibration is unlikely to be propagated to the circuit board.

If the electrode land is divided as described in Japanese Patent Laid-Open No. 2013-65820, however, mounting failure may occur if a position where the capacitor is mounted on the circuit board is displaced.

As described above, in recent years, the size of laminated ceramic capacitors has been made increasingly smaller. In a small-sized laminated ceramic capacitor, it is difficult to divide an electrode land since the electrode land is small in area. Accordingly, it is difficult to suppress acoustic noise by dividing the electrode land.

SUMMARY OF THE INVENTION

Preferred embodiments of the present invention provide a laminated ceramic electronic component capable of reducing noise referred to as acoustic noise.

A laminated ceramic electronic component according to a preferred embodiment of the present invention is provided with a ceramic body including first and second principal surfaces extending along lengthwise and widthwise directions of the laminated ceramic electronic component and opposed to each other, first and second side surfaces extending along the lengthwise and thickness directions of the laminated ceramic electronic component and opposed to each other, and first and second end surfaces extending along the widthwise and thickness directions of the laminated ceramic electronic component and opposed to each other; first and second inner electrodes including opposed portions in the ceramic body defined by portions opposed to each other in the thickness direction; a first terminal electrode extending from the first end surface to the second principal surface and electrically connected to the first inner electrode; and a second terminal electrode extending from the second end surface to the second principal surface and electrically connected to the second inner electrode. In plan view, the widths of the first and second terminal electrodes are smaller than the widths of the opposed portions of the first and second inner electrodes.

In another specific aspect of a laminated ceramic electronic component according to various preferred embodiments of the present invention, the first terminal electrode includes a first overlapping portion on the second principal surface overlapping with the opposed portions of the first and second inner electrodes in a plan view, a pair of widthwise edges of the first overlapping portion is positioned between a pair of widthwise edges of the opposed portions of the first and second inner electrodes, the second terminal electrode includes a second overlapping portion on the second principal surface overlapping with the opposed portions of the first and second inner electrodes in plan view, and a pair of widthwise edges of the second overlapping portion is positioned between a pair of widthwise edges of the opposed portions of the first and second inner electrodes.

In yet another specific aspect of a laminated ceramic electronic component according to various preferred embodiments of the present invention, the ceramic body includes a first ridge line portion continuous with the second principal surface and the first side surface and a second ridge line portion continuous with the second principal surface and the first side surface, and the first ridge line portion and the second ridge line portion are rounded. The first and second terminal electrodes extend to the first and second ridge line portions, but do not extend to the first and second side surfaces.

In still another specific aspect of a laminated ceramic electronic component according to various preferred embodiments of the present invention, the first inner electrode includes a lead-out portion extending from the opposed portion to the first end surface, the width of a portion of the lead-out portion continuous with the opposed portion is smaller than the width of the opposed portion, a width of the lead-out portion gradually decreases as the lead-out portion gets closer to the first end surface, the second inner electrode includes a lead-out portion extending from the opposed portion to the second end surface, the width of a portion of the lead-out portion continuous with the opposed portion is smaller than the width of the opposed portion, and a width of the lead-out portion gradually decreases as the leas-out portion gets closer to the second end surface.

In still another specific aspect of a laminated ceramic electronic component according to various preferred embodiments of the present invention, the first terminal electrode is extending along a range from the first end surface to the first principal surface, and the second terminal electrode is extending along a range from the second end surface to the first principal surface.

In still another specific aspect of a laminated ceramic electronic component according to various preferred embodiments of the present invention, the first terminal electrode includes a third overlapping portion on the first principal surface overlapping with the opposed portions of the first and second inner electrodes in plan view, a pair of widthwise edges at the third overlapping portion is positioned between a pair of widthwise edges of the opposed portions of the first and second inner electrodes, the second terminal electrode includes a fourth overlapping portion on the first principal surface overlapping with the opposed portions of the first and second inner electrodes in plan view, and a pair of widthwise edges of the fourth overlapping portion is positioned between a pair of widthwise edges of the opposed portions of the first and second inner electrodes.

In still another specific aspect of a laminated ceramic electronic component according to various preferred embodiments of the present invention, the ceramic body includes a third ridge line portion continuous with the first principal surface and the first side surface and a fourth ridge line portion continuous with the first principal surface and the second side surface, and the third ridge line portion and the fourth ridge line portion are rounded. The first and second terminal electrodes extend to the third and fourth ridge line portions, but do not extend to the first and second side surfaces.

In still another specific aspect of a laminated ceramic electronic component according to various preferred embodiments of the present invention, the thickness dimensions and the widthwise dimensions of the ceramic body differ, and the first and second end surfaces are opposed to each other in the longitudinal direction of the ceramic body.

According to various preferred embodiments of the present invention, it is possible to provide a laminated ceramic electronic component capable of reducing noise.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1A is a plan view of a laminated ceramic electronic component according to a first preferred embodiment of the present invention, whereas

DETAILED DESCRIPTION OF THE PREFERRED EMBODIMENTS

Hereinafter, specific preferred embodiments of the present invention will be described with reference to the accompanying drawings to clarify the present invention.

Figure 1A:
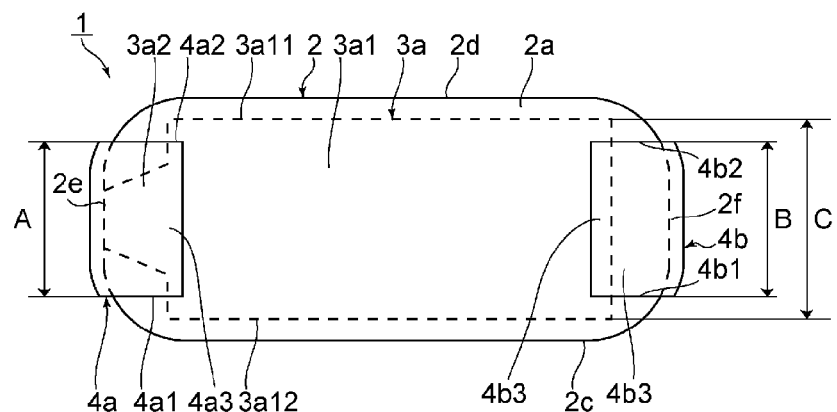
Figure 1B:
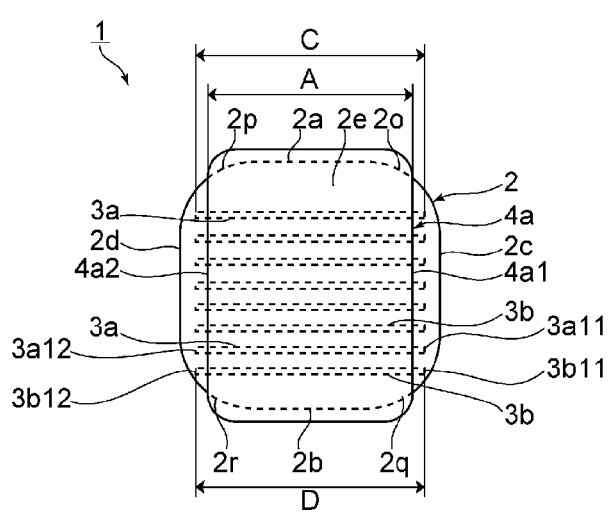
FIG. 1B is a view taken from an edge surface direction of the laminated ceramic electronic component according to the first preferred embodiment of the present invention and FIG. 1C is a perspective view of the laminated ceramic electronic component according to the first preferred embodiment of the present invention.
Figure 1C:
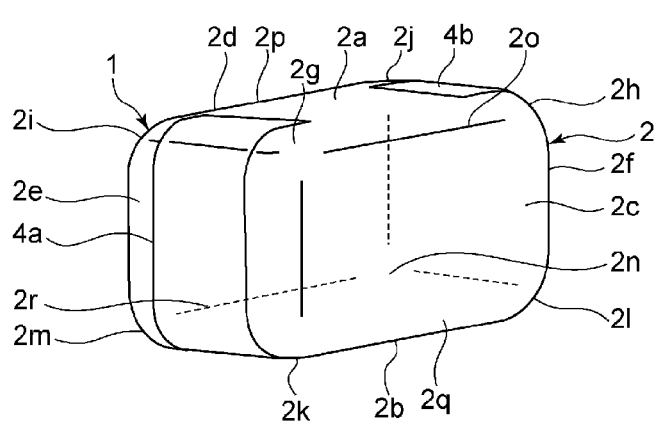
Figure 2:
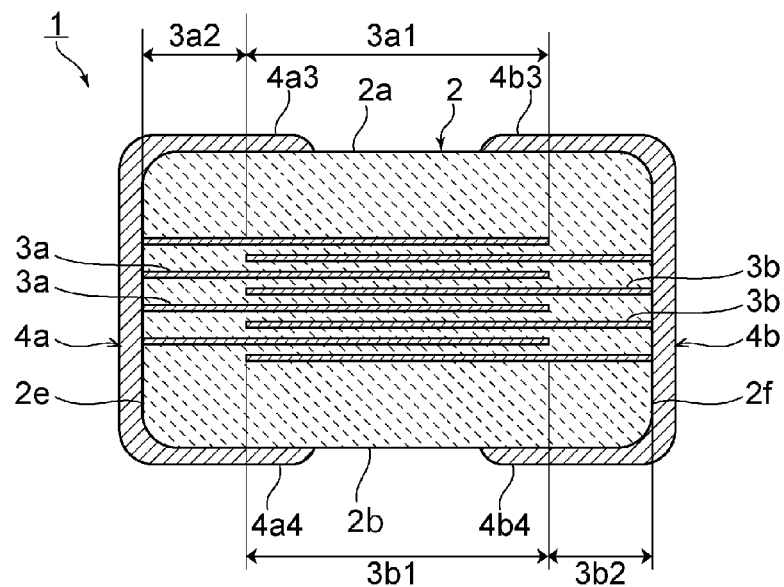
FIG. 2 is a side cross-sectional view of the laminated ceramic electronic component according to the first preferred embodiment of the present invention.

FIGS. 1A, 1B and 1C are a plan view, a view taken from an edge surface direction, and a perspective view, respectively, of a laminated ceramic electronic component according to a first preferred embodiment of the present invention. FIG. 2 is a side cross-sectional view of the ceramic electronic component according to the first preferred embodiment of the present invention.

A laminated ceramic electronic component 1 includes a rectangular or substantially rectangular solid-shaped ceramic body 2. The ceramic body 2 includes first and second principal surfaces 2a and 2b extending along the lengthwise and widthwise directions of the ceramic body and opposed to each other, first and second side surfaces 2c and 2d extending along the lengthwise and thickness directions of the ceramic body and opposed to each other, and first and second end surfaces 2e and 2f extending along the widthwise and thickness directions of the ceramic body and opposed to each other. In the present preferred embodiment, the lengthwise dimensions of the ceramic body 2 are larger than the widthwise dimensions thereof. Note that the lengthwise dimensions of the ceramic body 2 may be smaller than the widthwise dimensions thereof.

The ceramic body 2 includes first to eighth corner portions 2g, 2h, 2i, 2j, 2k, 2l, 2m and 2n continuous with three surfaces of the ceramic body 2.

In addition, the ceramic body 2 includes first to fourth ridge line portions 2o, 2p, 2q and 2r continuous with two surfaces of the ceramic body 2.

In the present preferred embodiment, the first to eighth corner portions 2g, 2h, 2i, 2j, 2k, 2l, 2m and 2n and the first to fourth ridge line portions 2o, 2p, 2q and 2r of the ceramic body 2 are rounded. Note that at least one of the first to eighth corner portions 2g, 2h, 2i, 2j, 2k, 2l, 2m and 2n and the first to fourth ridge line portions 2o, 2p, 2q and 2r of the ceramic body 2 may not be rounded.

In the present preferred embodiment, the ceramic body 2 preferably is composed of a high-dielectric ceramic material. Examples of the high-dielectric ceramic material include $BaTiO_3$, $CaTiO_3$ and $SrTiO_3$. Note that an accessory constituent, such as an Mn compound, an Fe compound, a Cr compound, a Co compound or an Ni compound, may be added as appropriate to the ceramic body 2. In addition, the ceramic body 2 may contain Si or glass.

As illustrated in FIG. 2, first and second inner electrodes 3a and 3b are disposed within the ceramic body 2. The first and second inner electrodes 3a and 3b include opposed portions 3a1 and 3b1 opposed to each other in the thickness direction.

The first inner electrode 3a includes a lead-out portion 3a2 continuous with the opposed portion 3a1 and extending to the first end surface 2e of the ceramic body 2. The second inner electrode 3b includes a lead-out portion 3b2 continuous with the opposed portion 3b1 and extending to the second end surface 2f of the ceramic body 2.

Referring back to FIG. 1A, the first inner electrode 3a includes third and fourth widthwise edges 3a11 and 3a12 at the opposed portion 3a1. In addition, as illustrated in FIG. 1B, the second inner electrode 3b includes third and fourth widthwise edges 3b11 and 3b12 at the opposed portion 3b1.

In the present preferred embodiment, a width of the lead-out portion 3a2 of the first inner electrode 3a gradually decreases as the lead-out portion 3a2 gets closer to the first end surface 2e of the ceramic body 2. Likewise, a width of the lead-out portion 3b2 of the second inner electrode 3b illustrated in FIG. 2 gradually decreases as the lead-out portion 3b2 gets closer to the second end surface 2f of the ceramic body 2. Since the lead-out portions 3a2 and 3b2 decrease in width in this way, the lead-out portions 3a2 and 3b2 are less likely to become exposed, more than necessary, out of the rounded first to eighth corner portions 2g, 2h, 2i, 2j, 2k, 2l, 2m and 2n and first to fourth ridge line portions 2o, 2p, 2q and 2r. Preferably, the widths of the portions continuous with the opposed portions 3a1 and 3b2 of the lead-out portions 3a2 and 3b2 are smaller than the widths of the opposed portions 3a1 and 3b2. Consequently, the lead-out portions 3a2 and 3b2 are even less likely to become exposed more than necessary. As a result of gradually decreasing the widths of the lead-out portions 3a2 and 3b2, a portion between the first and second end surfaces 2e and 2f and the opposed portions 3a1 and 3b1 increases in the contained amount of inner electrode, and therefore, hardens. In this case, the portion between the first and second end surfaces 2e and 2f and the opposed portions 3a1 and 3b1 is prevented from deformation, thus enabling the reduction of noise. Note that the widths of the lead-out portions 3a2 and 3b2 of the first and second inner electrodes 3a and 3b are not limited in particular.

First and second terminal electrodes 4a and 4b are disposed on the first and second end surfaces 2e and 2f of the ceramic body 2. As illustrated in FIGS. 1A and 1B, the first terminal electrode 4a includes first and second widthwise edges 4a1 and 4a2 and the second terminal electrode 4b includes first and second widthwise edges 4b1 and 4b2. In the present preferred embodiment, the distance between the first widthwise edge 4a1 and the second widthwise edge 4a2 of the first terminal electrode 4a is the same on the first end surface 2e and on the first and second principal surfaces 2a and 2b of the ceramic body 2. Likewise, the distance between the first widthwise edge 4b1 and the second widthwise edge 4b2 of the second terminal electrode 4b is the same on the second end surface 2f and on the first and second principal surfaces 2a and 2b of the ceramic body 2.

Figure 3:
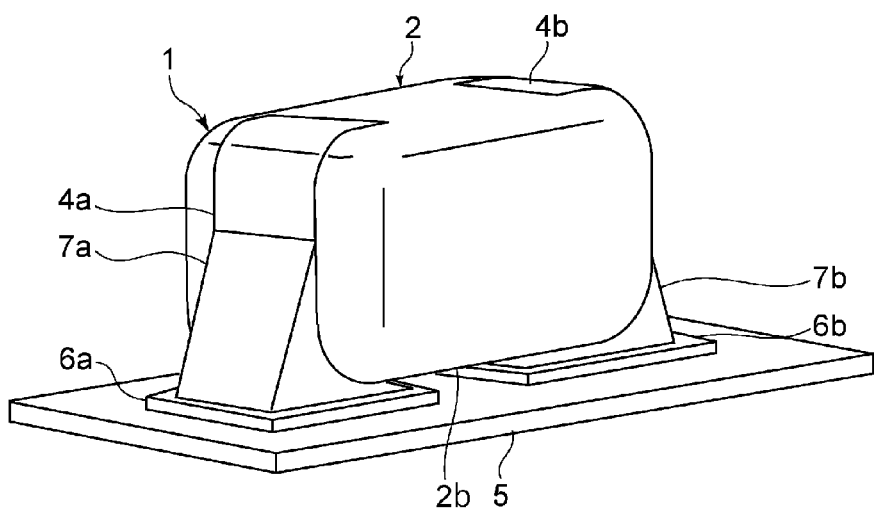
FIG. 3 is a perspective view illustrating a state of the laminated ceramic electronic component according to the first preferred embodiment of the present invention mounted on a circuit board.

FIG. 3 is a perspective view illustrating a state of the laminated ceramic electronic component according to the first preferred embodiment of the present invention mounted on a circuit board.

First and second electrode lands 6a and 6b are provided on a circuit board 5. A laminated ceramic electronic component 1 is mounted on the first and second electrode lands 6a and 6b through joining materials 7a and 7b. The first terminal electrode 4a of the laminated ceramic electronic component 1 is electrically connected to the electrode land 6a through the joining material 7a. The second terminal electrode 4b is electrically connected to the electrode land 6b through the joining material 7b. In the present preferred embodiment, the joining materials 7a and 7b are preferably composed of solder. Note that where appropriate, the joining materials 7a and 7b preferably composed of another metal for use as a brazing material.

The joining materials 7a and 7b define fillets by wetting and climbing the first and second terminal electrodes 4a and 4b on the first and second end surfaces 2e and 2f. The laminated ceramic electronic component 1 is mounted onto the circuit board 5 from the second principal surface 2b side. That is, in the present preferred embodiment, the second principal surface 2b corresponds to a mounting surface.

Referring back to FIGS. 1A and 1B, the distance between the first widthwise edge 4a1 and the second widthwise edge 4a2 of the first terminal electrode 4a, i.e., the width of the first terminal electrode 4a is defined as a distance A. Likewise, the distance between the first widthwise edge 4b1 and the second widthwise edge 4b2 of the second terminal electrode 4b, i.e., the width of the second terminal electrode 4b is defined as a distance B. The distances A and B are smaller, in plan view, than widths C and D of the first and second inner electrodes 3a and 3b at the opposed portions 3a1 and 3b1. In addition, the first and second widthwise edges 4a1, 4a2, 4b1 and 4b2 of the first and second terminal electrodes 4a and 4b are positioned on the inner side in the widthwise direction of the third and fourth widthwise edges 3a11, 3a12, 3b11 and 3b12 of the first and second inner electrodes 3a and 3b in plan view. The reason for such a structure being feasible is that, as described above, widths of the lead-out portions 3a2 and 3b2 of the first and second inner electrodes 3a and 3b illustrated in FIG. 2 respectively decrease as the lead-out portions 3a2 and 3b2 get closer to the first and second end surfaces 2e and 2f of the ceramic body 2. Note that "in plan view" refers to taking a view of a cross-section parallel to the principal surfaces of the laminated ceramic electronic component 1. Plan views are observed as drawings represented by FIG. 1A.

One of the unique features of the present preferred embodiment is that the distances A and B are smaller than the widths C and D. This feature enables the reduction of noise. The reason for this will be described hereinafter.

In order to confirm the advantageous effects of the laminated ceramic electronic component according to the present preferred embodiment, the inventors of the present application conducted experiments. First, there was prepared a ceramic body 2 having a lengthwise dimension of about 1.15 mm, a widthwise dimension of about 0.69 mm and a thickness dimension of about 0.68 mm, for example. Both the widths C and D of the opposed portions 3a1 and 3b1 of the first and second inner electrodes 3a and 3b were about 0.527 mm, for example. The capacitance of the ceramic body 2 was about 10 μF, for example. Next, the inventors of the present application fabricated a plurality of laminated ceramic electronic components by varying the distance A and equalizing the distance B to the distance A. Then, in each laminated ceramic electronic component, the inventors evaluated an acoustic pressure of noise at a frequency of about 5.33 kHz at which the acoustic pressure extended its maximum peak.

Figure 4:
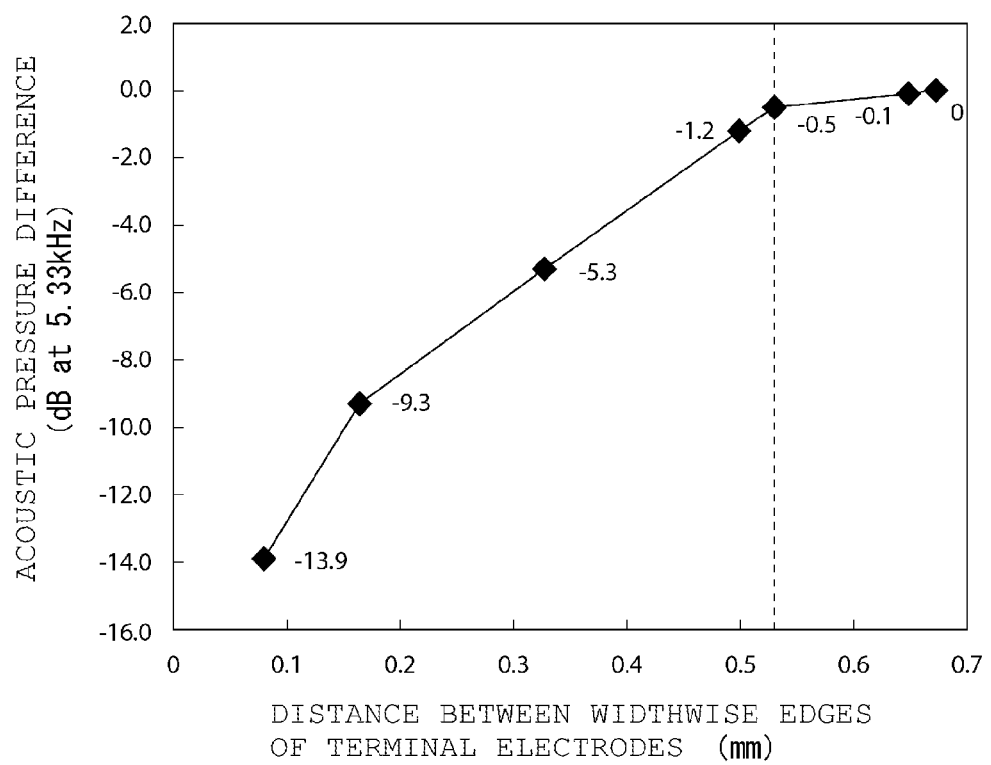
FIG. 4 is a graph illustrating the relationship of an acoustic pressure difference of noise between acoustic pressure values at each distance between the widthwise edges of terminal electrodes and at a distance of about 0.67 mm in the laminated ceramic electronic component according to the first preferred embodiment of the present invention and in a laminated ceramic electronic component fabricated for comparison.

In FIG. 4, the axis of abscissas represents the distance between the widthwise edges of terminal electrodes of each laminated ceramic electronic component fabricated in experiments, whereas the axis of ordinates represents the difference between an acoustic pressure value at the above-mentioned distance and an acoustic pressure value at a distance of about 0.67 mm as an acoustic pressure difference. The widths of the terminal electrodes of the respective fabricated laminated ceramic electronic components were about 0.081 mm, about 0.162 mm, about 0.324 mm, about 0.500 mm, about 0.527 mm, about 0.647 mm and about 0.670 mm, for example.

The distance between the widthwise edges of terminal electrodes in FIG. 4 corresponds to the distances A and B. If the distances A and B between the widthwise edges of terminal electrodes are larger than the widths C and D of the opposed portions 3a1 and 3b1 of the first and second inner electrodes 3a and 3b, no significant changes are observed in the acoustic pressure of noise. In contrast, if the distances A and B between the widthwise edges of terminal electrodes are smaller than the widths C and D of the opposed portions 3a1 and 3b1 of the first and second inner electrodes 3a and 3b, the acoustic pressure of noise is significantly low.

Hence, it is understood that the laminated ceramic electronic component 1 according to the present preferred embodiment is capable of reducing noise.

The reason for being able to reduce noise as the result of the distances A and B being smaller than the widths C and D is considered to be as follows. Noise is caused by the vibration of an effective volume portion within a laminated ceramic electronic component. Decreasing the width of a terminal electrode causes the width of the joining portion between the terminal electrode and a substrate to become also smaller than the width of the effective volume portion, thus significantly reducing, minimizing or preventing the amount of vibration transferred from the effective volume portion to the substrate. Noise thus is reduced.

Incidentally, a joining material may accumulate between the laminated ceramic electronic component 1 and the circuit board 5, as the result of the distances A and B being smaller than the widths C and D, when the laminated ceramic electronic component 1 is mounted on the circuit board 5. Consequently, the attitude of the laminated ceramic electronic component 1 may become unstable. Hence, as illustrated in FIG. 1B, the third and fourth ridge line portions 2q and 2r of the second principal surface 2b which is the mounting surface side are rounded in the ceramic body 2 of the present preferred embodiment. Accordingly, a gap is provided between the first and second electrode lands 6a and 6b and the first and second terminal electrodes 4a and 4b when the laminated ceramic electronic component 1 is mounted on the circuit board 5 illustrated in FIG. 3. In addition, the first and second terminal electrodes 4a and 4b extend to the third and fourth ridge line portions 2q and 2r of the ceramic body 2. Accordingly, molten joining materials 7a and 7b go into the gap, thus forming fillets over a range from the third and fourth ridge line portions 2q and 2r of the ceramic body 2 to the vicinity thereof. It is therefore possible to effectively stabilize the mounting position of the laminated ceramic electronic component 1, while maintaining the above-described configuration configured to reduce noise.

Yet additionally, the first and second terminal electrodes 4a and 4b do not extend to the first and second side surfaces 2c and 2d of the ceramic body 2. Accordingly, it is possible to prevent the formation of the fillets to a moderate extent. Consequently, even if adjacent laminated ceramic electronic components 1 come into contact with each other when a plurality of laminated ceramic electronic components 1 is mounted on the same circuit board 5, the first and second terminal electrodes 4a and 4b of the adjacent laminated ceramic electronic components 1 are unlikely to come into electrical contact with each other. It is therefore possible to reduce the spacing between laminated ceramic electronic components 1 when mounting the laminated ceramic electronic components 1. Reducing the spacing between laminated ceramic electronic components 1 causes vibrations transferred from the laminated ceramic electronic components 1 to the circuit board 5 to cancel each other. Noise is thus reduced further.

Note that the shape of portions of the first and second terminal electrodes 4a and 4b on the opposite side of the mounting surface may be the same as the shape of the first and second terminal electrodes 4a and 4b on the mounting surface side, as in the present preferred embodiment. That is, the first and second terminal electrodes 4a and 4b, as far as not extending to the first and second side surfaces 2c and 2d, may extend to the first and second ridge line portions 2o and 2p.

The inventors have discovered that if the first and second terminal electrodes 4a and 4b do not extend to the first and second side surfaces 2c and 2d, the laminated ceramic electronic component 1 is liable to break or crack. Hence, the present inventors configured the laminated ceramic electronic components, so that the first terminal electrode 4a was positioned on the first and second principal surfaces 2a and 2b and included first overlapping portions 4a3 and 4a4 overlapping, in plan view, with the opposed portions 3a1 and 3b1 of the first and second inner electrodes 3a and 3b, and that a pair of widthwise edges of the first overlapping portions 4a3 and 4a4 was positioned between a pair of widthwise edges of the opposed portions 3a1 and 3b1, as illustrated in FIGS. 1A and 2. Likewise, the present inventors configured the laminated ceramic electronic components, so that the second terminal electrode 4b was positioned on the first and second principal surfaces 2a and 2b and included second overlapping portions 4b3 and 4b4 overlapping, in plan view, with the opposed portions 3a1 and 3b1 of the first and second inner electrodes 3a and 3b, and that a pair of widthwise edges of the second overlapping portions 4b3 and 4b4 was positioned between the pair of widthwise edges of the opposed portions 3a1 and 3b1. Consequently, the laminated ceramic electronic component 1 is even less likely to break or crack. The reason for this will be described hereinafter.

Non-limiting examples of a method for manufacturing a laminated ceramic electronic component include calcinating a raw ceramic body to obtain a ceramic body, and then coating and printing paste for terminal electrodes on the ceramic body to form first and second terminal electrodes. In this case, tensile stress is applied to the ceramic body due to thermal contraction caused when the first and second terminal electrodes are calcinated. Accordingly, the laminated ceramic electronic component breaks or cracks in some cases.

The ceramic body 2 and the first and second terminal electrodes 4a and 4b of the laminated ceramic electronic component according to the first preferred embodiment of the present invention preferably are formed in the same way as those of the above-described laminated ceramic electronic component. Also in the present preferred embodiment, tensile stress is applied to the ceramic body 2 due to a thermal contraction difference between the first and second terminal electrodes 4a and 4b and the ceramic body 2. Likewise, tensile stress is applied to the ceramic body 2 due to a thermal contraction difference between the first and second inner electrodes 3a and 3b and the ceramic body 2. In the present preferred embodiment, however, portions of the first and second terminal electrodes 4a and 4b positioned on the first and second principal surfaces 2a and 2b and the first and second inner electrodes 3a and 3b overlap with each other in plan view. Accordingly, tensile stress applied to the ceramic body 2 is relieved by the compressive stress. The laminated ceramic electronic component 1 is therefore unlikely to break or crack.

Figure 5:
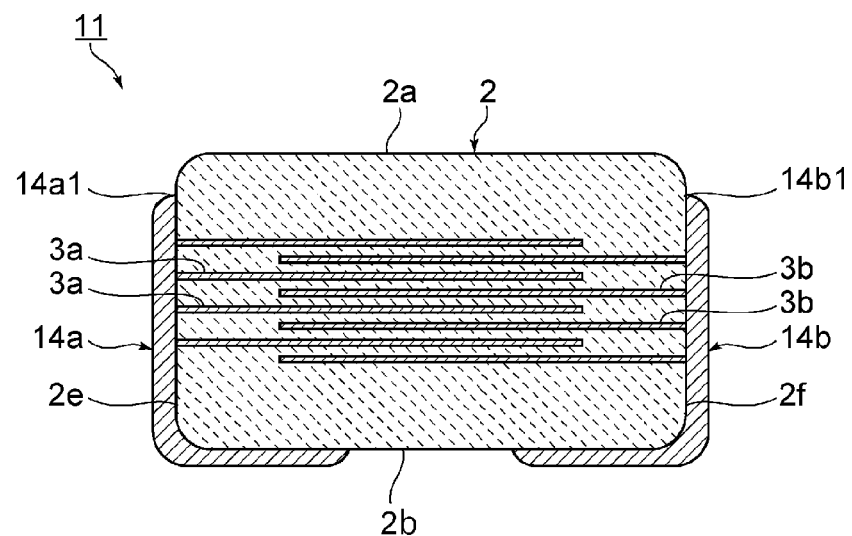
FIG. 5 is a side cross-sectional view of a laminated ceramic electronic component according to a second preferred embodiment of the present invention.

FIG. 5 is a side cross-sectional view of a laminated ceramic electronic component according to a second preferred embodiment of the present invention.

In a laminated ceramic electronic component 11 according to the present preferred embodiment, first and second terminal electrodes 14a and 14b are extending along a range from a second principal surface 2b of a ceramic body 2 to first and second end surfaces 2e and 2f, but are not disposed on a first principal surface 2a of the ceramic body 2. It is therefore possible to reduce thickness dimensions.

Figure 6:
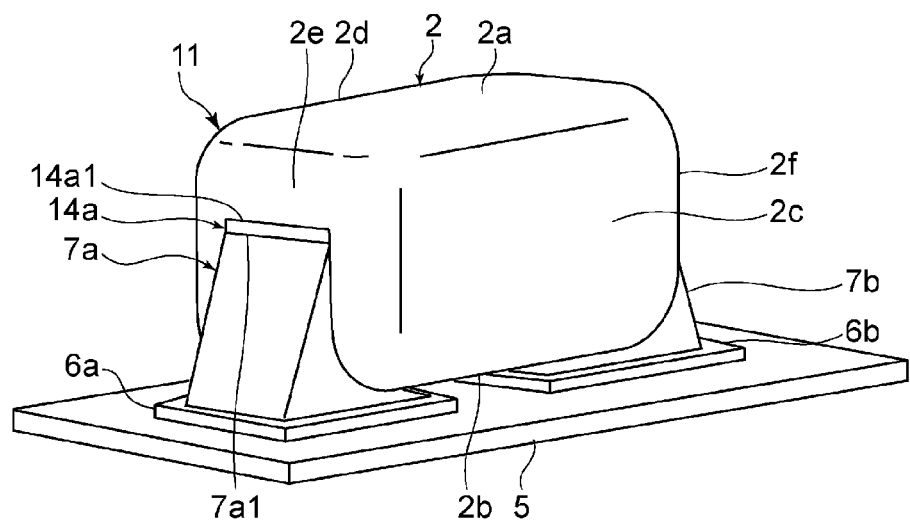
FIG. 6 is a perspective view illustrating a state of the laminated ceramic electronic component according to the second preferred embodiment of the present invention mounted on a circuit board.

FIG. 6 is a perspective view illustrating a state of the laminated ceramic electronic component according to the second preferred embodiment of the present invention mounted on a circuit board.

When the laminated ceramic electronic component 11 is mounted on a circuit board 5, fillets resulting from joining materials 7a and 7b are formed on first and second electrode lands 6a and 6b on the circuit board 5. As illustrated in FIGS. 5 and 6, thickness edges 14a1 and 14b1 of the first and second terminal electrodes 14a and 14b are disposed on the first and second end surfaces 2e and 2f, respectively. Accordingly, the positions of a thickness edge 7a1 of the joining material 7a and a thickness edge of the joining material 7b are the same as the positions of the thickness edges 14a1 and 14b1 of the first and second terminal electrodes 14a and 14b, or close to the second principal surface 2b of the ceramic body 2. That is, the positions of the thickness edge 7a1 of the joining material 7a and the thickness edge of the joining material 7b are adjusted by adjusting positions of the thickness edges 14a1 and 14b1 of the first and second terminal electrodes 14a and 14b. Consequently, it is possible to position the thickness edges 14a1 and 14b1 of the first and second terminal electrodes 14a and 14b, so as to be able to reduce noise.

The shapes of the laminated ceramic electronic component on the first principal surface 2a side and on the second principal surface 2b side are asymmetrical to each other. Accordingly, it is possible to easily identify the second principal surface 2b which is a mounting surface. Any mounting failure is thus reduced.

In addition, when a plurality of laminated ceramic electronic components 11 is housed in a taped electronic component array, it is possible to securely align the orientations of the laminated ceramic electronic components 11. One preferred embodiment of the taped electronic component array in which laminated ceramic electronic components 11 are housed will be shown hereinafter.

Figure 7:
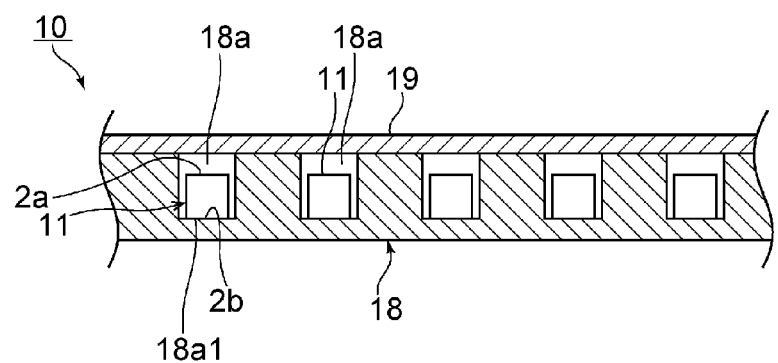
FIG. 7 is a lengthwise cross-sectional view of a taped electronic component array, illustrating one preferred embodiment the taped electronic component array in which the laminated ceramic electronic components according to the second preferred embodiment of the present invention are housed.

FIG. 7 is a lengthwise cross-sectional view of a taped electronic component array, illustrating one preferred embodiment of the taped electronic component array in which the laminated ceramic electronic components according to the second preferred embodiment of the present invention are housed.

A taped electronic component array 10 includes an elongated carrier tape 18 in which a plurality of concave portion 18a is distributed. The laminated ceramic electronic components are housed in the concave portions 18a, so that the second principal surface 2b faces the bottom surface 18a1 side of each concave portion 18a of the carrier tape 18. A cover tape 19 is disposed so as to cover the respective concave portions 18a of the carrier tape 18.

When the laminated ceramic electronic components 11 housed in the taped electronic component array 10 are mounted, the cover tape 19 of the taped electronic component array 10 is removed first. Next, each laminated ceramic electronic component 11 is adsorbed from the first principal surface 2a side of each laminated ceramic electronic component 11 and mounted on the circuit board from the second principal surface 2b side. Accordingly, the orientations of the laminated ceramic electronic components 11 need to be aligned in the taped electronic component array 10. Since the first principal surface 2a and the second principal surface 2b of each laminated ceramic electronic component 11 are easily discriminated from each other as described above, it is possible to securely and easily align the orientations of the laminated ceramic electronic components 11 when housing the components in the taped electronic component array 10.

The first and second terminal electrodes 14a and 14b are not disposed on the first principal surface 2a of the laminated ceramic electronic component 11. Accordingly, any irregularities resulting from the first and second terminal electrodes 14a and 14b are not present on the first principal surface 2a of each laminated ceramic electronic component 11. It is therefore possible to more securely adsorb the first principal surface 2a side of each laminated ceramic electronic component 11 at the time of mounting. Any mounting failure is thus reduced further.

Figure 8:
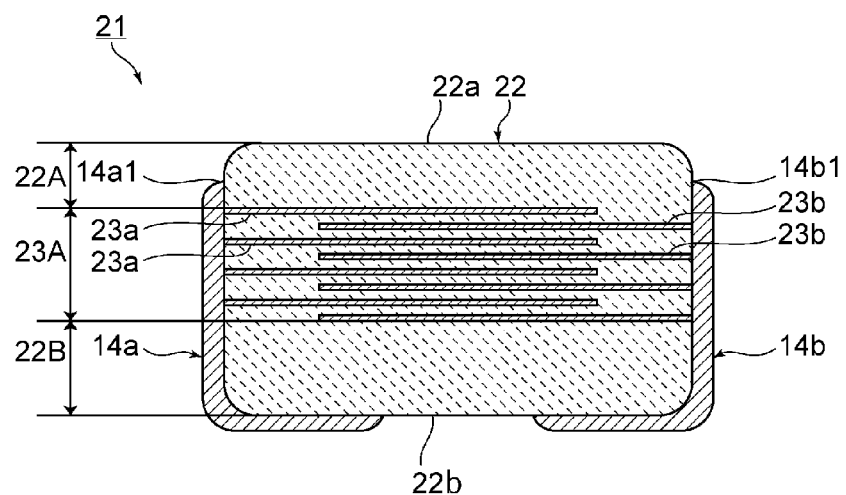
FIG. 8 is a side cross-sectional view of a laminated ceramic electronic component according to a third preferred embodiment of the present invention.

FIG. 8 is a side cross-sectional view of a laminated ceramic electronic component according to a third preferred embodiment of the present invention.

A laminated ceramic electronic component 2l includes an inner electrode layer 23A in which first and second inner electrodes 23a and 23b are laminated in the thickness direction of the component. A first outer layer 22A is disposed in the thickness direction between the inner electrode layer 23A and a first principal surface 22a of a ceramic body 22. Likewise, a second outer layer 22B is disposed between the inner electrode layer 23A and a second principal surface 22b of the ceramic body 22.

In the present preferred embodiment, the thickness of the second outer layer 22B is larger than the thickness of the first outer layer 22A. Accordingly, the distance between the inner electrode layer 23A and the second principal surface 22b which is a mounting surface increases. That is, a path through which vibration propagates from the inner electrode layer 23A to the second principal surface 22b side of the first and second terminal electrodes 14a and 14b becomes longer. Noise is thus reduced even further.

In addition, even if the thickness of the ceramic body 22 in the present preferred embodiment is made larger than the thickness of the ceramic body 2 in the above-described first preferred embodiment, it is possible to keep the thickness of the laminated ceramic electronic component 21 smaller than the thickness of the laminated ceramic electronic component 1 in the first preferred embodiment. Accordingly, the thickness of the second outer layer 22B is able to be made even larger in a case where thickness dimensions are defined. Noise is thus reduced even further.

Figure 9:
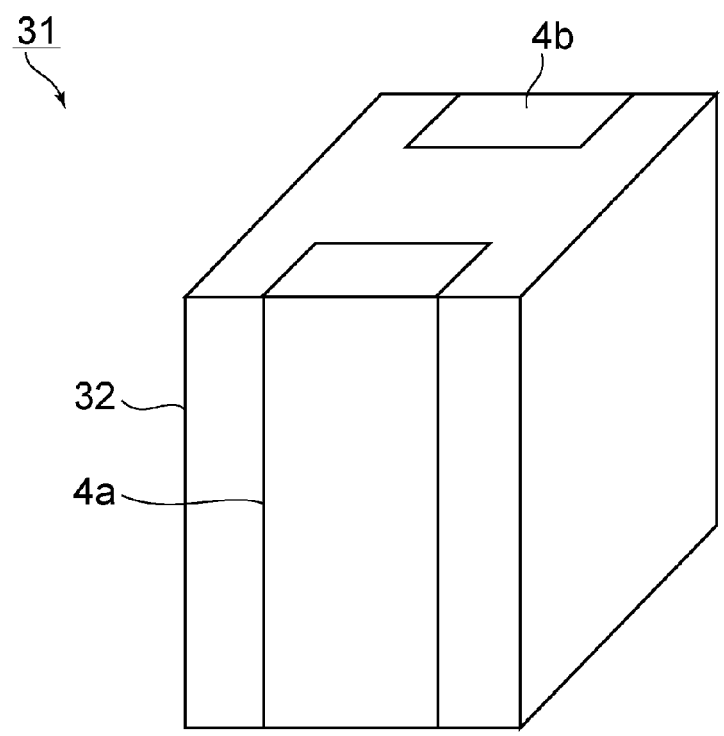
FIG. 9 is a perspective view of a laminated ceramic electronic component according to a fourth preferred embodiment of the present invention.

FIG. 9 is a perspective view of a laminated ceramic electronic component according to a fourth preferred embodiment of the present invention.

Preferably, none of the corner portions and ridge line portions of the ceramic body 32 in the laminated ceramic electronic component 31 are rounded. In addition, the thickness dimensions of the ceramic body 32 are larger than the widthwise dimensions thereof.

Incidentally, examples of methods commonly used to identify the orientations of electronic components when mounting the electronic components may include transmission recognition. Transmission recognition is a method for recognizing the orientation of an electronic component by a projection view of the outer shape of the electronic component. The widthwise dimensions and the thickness dimensions of the laminated ceramic electronic component 31 differ from each other. Consequently, it is possible to securely identify the principal-surface direction of the laminated ceramic electronic component 31 when mounting the laminated ceramic electronic component 31.

Preferably, the thickness dimensions of the laminated ceramic electronic component 31 preferably are about 20% or more larger than the widthwise dimensions thereof, for example. Consequently, it is possible to securely identify the principal-surface direction of the laminated ceramic electronic component 31 when mounting the laminated ceramic electronic component 31.

Note that in the present preferred embodiment, preferably none of the corner portions and ridge line portions of the ceramic body 32 are rounded. At least one of the corner portions and ridge line portions may be rounded, however.

Figure 10:
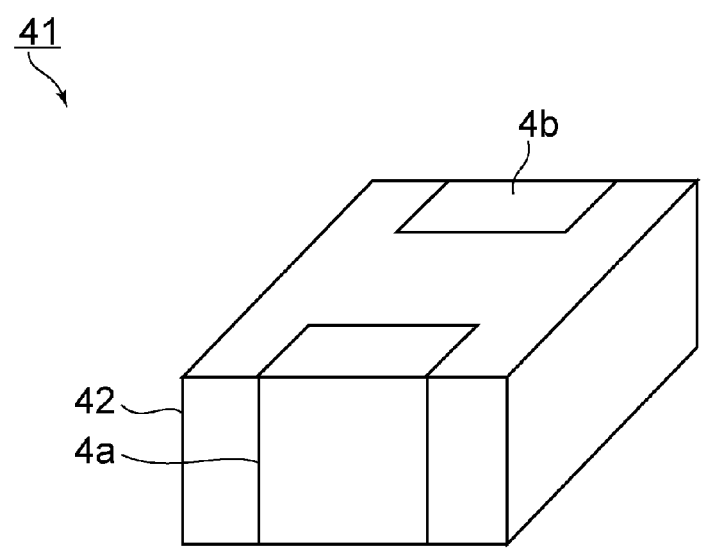
FIG. 10 is a perspective view of a laminated ceramic electronic component according to a fifth preferred embodiment of the present invention.

FIG. 10 is a perspective view of a laminated ceramic electronic component according to a fifth preferred embodiment of the present invention.

In the present preferred embodiment, none of the corner portions and ridge line portions of a ceramic body 42 are rounded in a laminated ceramic electronic component 41, as in the fourth preferred embodiment. In the present preferred embodiment, however, the thickness dimensions of the ceramic body 42 are smaller than the widthwise dimensions thereof. That is, the widthwise dimensions of the laminated ceramic electronic component 41 differ from the dimensions of the thickness principal surface thereof. Consequently, it is possible to securely identify the principal-surface direction of the laminated ceramic electronic component 41 when mounting the laminated ceramic electronic component 41.

Preferably, the thickness dimensions of the laminated ceramic electronic component 41 are about 20% or more smaller than the widthwise dimensions thereof, for example. Consequently, it is possible to more securely identify the principal-surface direction of the laminated ceramic electronic component 41 when mounting the laminated ceramic electronic component 41.

Note that in the present preferred embodiment, preferably none of the corner portions and ridge line portions of the ceramic body 42 are rounded. At least one of the corner portions and ridge line portions may be rounded, however.

Figure 11:
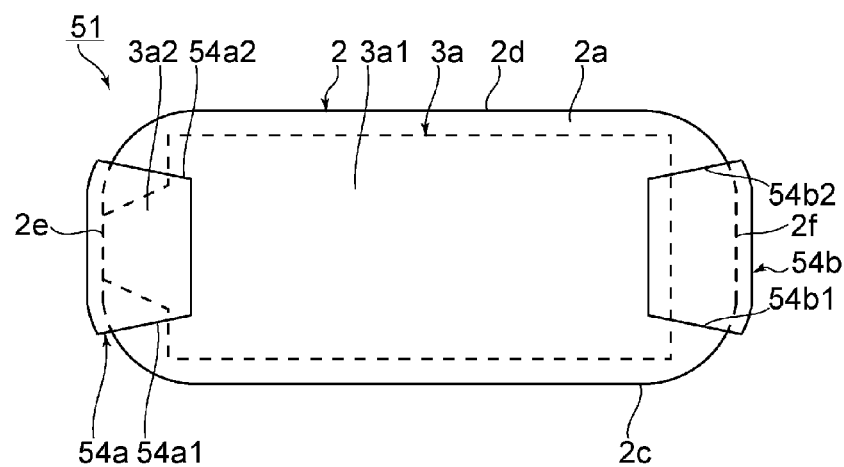
FIG. 11 is a plan view of a laminated ceramic electronic component according to a sixth preferred embodiment of the present invention.

FIG. 11 is a plan view of a laminated ceramic electronic component according to a sixth preferred embodiment of the present invention.

In a first principal surface 2a of a ceramic body 2 of a laminated ceramic electronic component 51, the distance between a first widthwise edge 54a1 and a second widthwise edge 54a2 of the first terminal electrode 54a decreases as the first terminal electrode 54a gets closer to the second end surface 2f of the ceramic body 2. Likewise, the distance between a first widthwise edge 54b1 and a second widthwise edge 54b2 of the second terminal electrode 54b decreases as the second terminal electrode 54b gets closer to the first end surface 2e of the ceramic body 2. Portions of the first and second terminal electrodes 54a and 54b positioned on the first principal surface 2a overlap, in plan view, with a first inner electrode 3a and a second inner electrode.

Also in such a case as described above, tensile stress applied to the ceramic body 2 is relieved by the first and second terminal electrodes 54a and 54b, as in the first preferred embodiment. Consequently, the laminated ceramic electronic component 51 is even less likely to break or crack.

Note that whereas the shapes of the portions of the first and second terminal electrodes 54a and 54b positioned on the first principal surface 2a have been shown in the present preferred embodiment, the shapes of portions of the first and second terminal electrodes 54a and 54b positioned on the second principal surface 2b may also be different from those in the first preferred embodiment.

Figure 12:
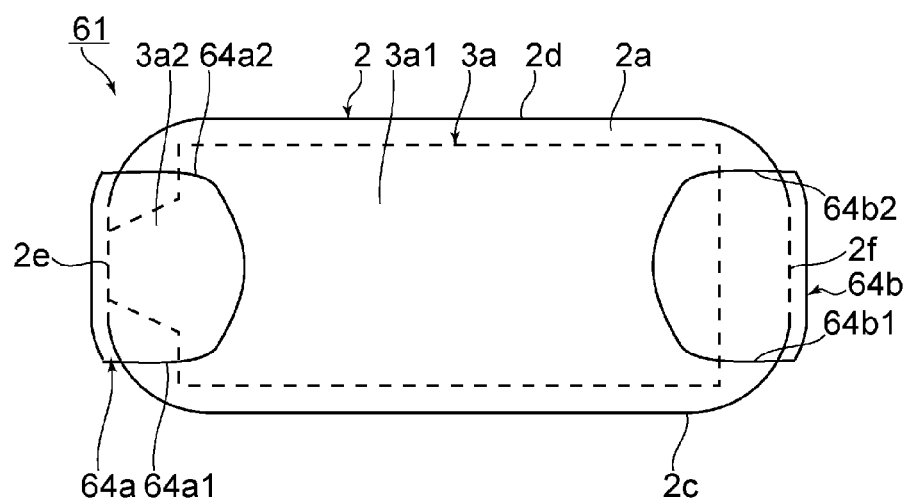
FIG. 12 is a plan view of a laminated ceramic electronic component according to a seventh preferred embodiment of the present invention.

FIG. 12 is a plan view of a laminated ceramic electronic component according to a seventh preferred embodiment of the present invention.

In a first principal surface 2a of a ceramic body 2 of a laminated ceramic electronic component 61, first and second widthwise edges 64a1 and 64a2 of a first terminal electrode 64a are curved in plan view. In addition, the distance between a first widthwise edge 64a1 and a second widthwise edge 64a2 of the first terminal electrode 64a decreases as the first terminal electrode 64a gets closer to the second end surface 2f of the ceramic body 2. Likewise, first and second widthwise edges 64b1 and 64b2 of a second terminal electrode 64b are curved in plan view. In addition, the distance between a first widthwise edge 64b1 and a second widthwise edge 64b2 of the second terminal electrode 64b decreases as the second terminal electrode 64a gets closer to the first end surface 2e of the ceramic body 2. Portions of the first and second terminal electrodes 64a and 64b positioned on the first principal surface 2a overlap, in plan view, with a first inner electrode 3a and a second inner electrode.

Also in such a case as described above, tensile stress applied to the ceramic body 2 is relieved by the first and second terminal electrodes 64a and 64b, as in the first preferred embodiment. Consequently, the laminated ceramic electronic component 61 is even less likely to break or crack.

Note that whereas the shapes of the portions of the first and second terminal electrodes 64a and 64b positioned on the first principal surface 2a have been shown in the present preferred embodiment, the shapes of portions of the first and second terminal electrodes 64a and 64b positioned on the second principal surface 2b may also be different from those in the first preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A laminated ceramic electronic component comprising:
   a ceramic body including first and second principal surfaces extending along lengthwise and widthwise directions of the laminated ceramic electronic component and opposed to each other, first and second side surfaces extending along the lengthwise and thickness directions of the laminated ceramic electronic component and opposed to each other, and first and second end surfaces extending along the widthwise and thickness directions of the laminated ceramic electronic component and opposed to each other;
   first and second inner electrodes within the ceramic body and including opposed portions opposed to each other in the thickness direction;

a first terminal electrode extending along a range from the first end surface to the second principal surface and electrically connected to the first inner electrode; and a second terminal electrode extending along a range from the second end surface to the second principal surface and electrically connected to the second inner electrode; wherein widths of the first and second terminal electrodes are smaller, in plan view, than widths of the opposed portions of the first and second inner electrodes; and the ceramic body includes a first ridge line portion continuous with the second principal surface and the first side surface and a second ridge line portion continuous with the second principal surface and the first side surface, the first ridge line portion and the second ridge line portion are rounded, and the first and second terminal electrodes extend onto the first and second ridge line portions but do not extend to the first and second side surfaces.

2. The laminated ceramic electronic component according to claim 1, wherein the first terminal electrode includes a first overlapping portion on the second principal surface overlapping with the opposed portions of the first and second inner electrodes in plan view, a pair of widthwise edges of the first overlapping portion is positioned between a pair of widthwise edges of the opposed portions of the first and second inner electrodes, the second terminal electrode includes a second overlapping portion on the second principal surface overlapping with the opposed portions of the first and second inner electrodes in plan view, and a pair of widthwise edges of the second overlapping portion is positioned between a pair of widthwise edges of the opposed portions of the first and second inner electrodes.

3. The laminated ceramic electronic component according to claim 1, wherein the first inner electrode includes a lead-out portion extending from the opposed portion to the first end surface, a width of a portion of the lead-out portion continuous with the opposed portion is smaller than a width of the opposed portion, a width of the lead-out portion gradually decreases as the lead-out portion gets closer to the first end surface, the second inner electrode includes a lead-out portion extending from the opposed portion to the second end surface, a width of a portion of the lead-out portion continuous with the opposed portion is smaller than a width of the opposed portion, and a width of the lead-out portion gradually decreases as the lead-out portion gets closer to the second end surface.

4. The laminated ceramic electronic component according to claim 1, wherein the first terminal electrode extends along a range from the first end surface to the first principal surface, and the second terminal electrode extends along a range from the second end surface to the first principal surface.

5. The laminated ceramic electronic component according to claim 4, wherein the first terminal electrode includes a third overlapping portion on the first principal surface overlapping with the opposed portions of the first and second inner electrodes in plan view, a pair of widthwise edges at the third overlapping portion is positioned between a pair of widthwise edges of the opposed portions of the first and second inner electrodes, the second terminal electrode includes a fourth overlapping portion on the first principal surface overlapping with the opposed portions of the first and second inner electrodes in plan view, and a pair of widthwise edges of the fourth overlapping portion is positioned between a pair of widthwise edges of the opposed portions of the first and second inner electrodes.

6. The laminated ceramic electronic component according to claim 4, wherein the ceramic body includes a third ridge line portion continuous with the first principal surface and the first side surface and a fourth ridge line portion continuous with the first principal surface and the second side surface, the third ridge line portion and the fourth ridge line portion are rounded, and the first and second terminal electrodes extend to the third and fourth ridge line portions but do not extend to the first and second side surfaces.

7. The laminated ceramic electronic component according to claim 1, wherein thickness dimensions and widthwise dimensions of the ceramic body differ, and the first and second end surfaces are opposed to each other in a longitudinal direction of the ceramic body.

8. The laminated ceramic electronic component according to claim 1, wherein the first and second terminal electrodes extend along a range from the second principal surface to the first and second end surfaces but are not disposed on the first principal surface of the ceramic body.

9. The laminated ceramic electronic component according to claim 1, wherein shapes of the laminated ceramic electronic component on the first principal surface side and on the second principal surface side are asymmetrical to each other.

10. The laminated ceramic electronic component according to claim 1, wherein the ceramic body includes an inner electrode layer including the first and second inner electrodes, a first outer layer between the inner electrode layer and the first principal surface, and a second outer layer between the inner electrode layer and the second principal surface.

11. The laminated ceramic electronic component according to claim 10, wherein a thickness of the second outer layer is larger than a thickness of the first outer layer.

12. The laminated ceramic electronic component according to claim 1, wherein first and second widthwise edges of the first terminal electrode are curved in plan view.

13. The laminated ceramic electronic component according to claim 1, wherein a distance between a first widthwise edge and a second widthwise edge of the first terminal electrode decreases as the first terminal electrode gets closer to the second end surface.

14. The laminated ceramic electronic component according to claim 1, wherein first and second widthwise edges of the second terminal electrode are curved in plan view.

15. The laminated ceramic electronic component according to claim 1, wherein a distance between a first widthwise edge and a second widthwise edge of the second terminal electrode decreases as the second terminal electrode gets closer to the first end surface.

16. The laminated ceramic electronic component according to claim 1, wherein the laminated ceramic electronic component is a capacitor.

* * * * *